United States Patent Office 3,164,614
Patented Jan. 5, 1965

3,164,614
NEW REAGENTS FOR PEPTIDE SYNTHESIS
Ernest D. Nicolaides and Horace A. De Wald, Ann Arbor, Mich., assignors to Parke, Davis & Company, Detroit, Mich., a corporation of Michigan
No Drawing. Filed May 18, 1961, Ser. No. 110,861
11 Claims. (Cl. 260—345.8)

This invention relates to certain substituted amino acid derivatives and to methods for producing these compounds. More particularly, the invention relates to serine and threonine derivatives of the formula

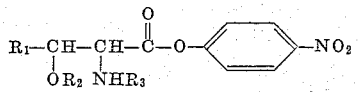

wherein $R_1$ is hydrogen or methyl, $R_2$ is hydrogen, lower alkanoyl, halo-substituted lower alkanoyl, benzyl, carbamyl, or tetrahydropyranyl, and $R_3$ is carbobenzoxy, p-chlorocarbobenzoxy, p-nitrocarbobenzoxy, or phthaloyl.

The compounds of this invention are useful as chemical intermediates for peptide synthesis. Further, the above-described novel reagents can be used with considerable advantage over known reagents for incorporating the poly-functional amino acids of serine and threonine into medically useful polypeptides. For example, Bradykinin, a hypotensive and smooth muscle stimulant, contains serine as one of its amino acids. By using certain compounds of this invention ($R_1$=H; $R_2$ and $R_3$ as described above) the serine moiety can be advantageously introduced into the system which comprises Bradykinin. The various Polymyxins (antibiotics) contain both serine and threonine in their amino acid chains and these moieties can be advantageously introduced into the Polymyxin molecule by means of the compounds which form the basis of the present patent application. ACTH also contains a serine moiety, which moiety can be introduced using the presently claimed reagents.

Current methods of polypeptide synthesis utilizing serine and threonine leave much to be desired. The present method of choice for incorporating these amino acids into a polypeptide employs their N-carbobenzoxy-amino acid-azides. These reagents are unstable and extremely difficult to handle. Because of these inherently disadvantageous characteristics, the formation of many undesirable side products accompanies their use. The azides, for example, have a strong tendency to rearrange with the formation of an isocyanate—this isocyanate can then react with available groups in the reaction medium to form products which differ only slightly from the desired polypeptides and which are therefore extremely difficult, if not impossible, to separate from the sought product. The resulting lower yield of polypeptide with concomitant contamination has seriously hampered efforts to incorporate the polyfunctional amino acids of serine and threonine into synthetically produced polypetides. By contrast, the compounds of this invention are stable and easy to handle. Their use in polypeptide synthesis gives high yields of products having a high degree of purity. There is no tendency for the p-nitrophenyl esters of the present invention to rearrange and thus no undesirable side reactions can take place. The acidic p-nitrophenol which is formed as the reaction proceeds is easily separable from the sought polypetides by standard extraction techniques.

Standard procedures of peptide synthesis can be used for introduction of serine and threonine into peptide chains via the presently claimed reagents. For example, when a solution of L-prolyl-L-phenylalanine, methyl ester is treated with an approximately equivalent quantity of N-carbobenzoxy-L-serine, p-nitrophenyl ester in a solvent such as ethyl acetate at a temperature below 50° C., a 71% yield of pure N-carbobenzoxy-L-seryl-L-prolyl-L-phenylalanine, methyl ester is obtained. This contrasts the lower yield of crude tripeptide which is obtained using N-carbobenzoxy-L-serylazide for the introduction of the serine moiety. Of even greater significance is the fact that the azide reagent is far too difficult to use on a large scale—this is not true of the present novel reagent which is easily adaptable for the large scale introduction of either serine or threonine into polypeptide chains.

In accordance with the present invention the novel active amino acid intermediates can be produced by esterifying an amino acid of the formula

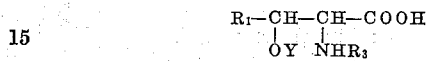

with p-nitrophenol; wherein $R_1$ and $R_3$ are the same as described earlier and Y is lower alkanoyl, halo-substituted lower alkanoyl, benzyl, carbamyl, or tetrahydropyranyl. Of the lower alkanoyl groups, acetyl is preferred while chloroacetyl is preferred from among the various halo-substituted lower alkanoyl groups. For the purposes of this invention the esterification is usually carried out by treating the amino acid shown above with equimolar quantities of p-nitrophenol and dicyclohexylcarbodiimide, although a slight excess of either reagent is not objectionable. The reaction can be conveniently carried out by contacting the reactants in the presence of a solvent. Unreactive solvents such as acetonitrile, tetrahydrofuran, dioxane, nitromethane, ethyl acetate, and dimethylformamide are suitable for this reaction. Ethyl acetate and dimethylformamide have been found to be particularly useful. The reaction is usually carried out below 50° C. and temperatures in the range of 0–25° C. are to be preferred.

In the event that the starting material of the above-described synthetic procedure has Y=tetrahydropyranyl, then the product isolated will be the corresponding tetrahydropyranyl ether, p-nitrophenyl ester of either serine or threonine. The tetrahydropyranyl ether linkage can be cleaved with dilute acid without effecting other reactive centers within the molecule. Using such a procedure, one is able to obtain a product in which the hydroxyl group is unsubstituted ($R_2$=hydrogen, $R_1$ and $R_3$ as described above).

As indicated earlier, the preferred hydroxyl protecting groups are tetrahydropyranyl, lower alkanoyl (especially acetyl), halo-substituted lower alkanoyl (especially chloroacetyl), benzyl, and carbamyl groups. These protecting groups can be introduced via standard chemical procedures. For example, the tetrahydropyranyl group is introduced by reacting the N-substituted amino acid with dihydropyran. The alkanoyl and haloalkanoyl groups are introduced using standard acylating agents such as the corresponding acid chlorides or anhydrides. The O-benzyl group can be introduced by reacting an $\alpha,\beta$-dibromo ester with sodium benzylate, hydrolyzing the ester to the free acid, treating with ammonia to introduce the $\alpha$-$NH_2$ group, and finally adding the N-carbobenzoxy group by treatment with carbobenzoxy chloride. The carbamyl group is introduced by treating N-substituted serine or threonine stepwise with phenyl chloroformate, liquid ammonia, and papain solution—one obtains thereby the O-carbamyl, N-substituted amino acid having a free carboxyl group.

The following examples are illustrative of, but not limiting on, the present invention:

*Example 1*

N - carbobenzoxy-L-serine, tetrahydropyranyl ether (12.7 g.) is dissolved in 90 ml. ethyl acetate. The mixture is cooled in an ice bath and 6.25 g. of p-nitrophenol is added, followed by 8.2 g. dicyclohexylcarbodiimide.

The mixture is stirred at ice bath temperature for one hour and then at room temperature for two additional hours. The resulting mixture is filtered to remove the dicyclohexyl urea, the filtrate washed with sodium bicarbonate solution, dried over anhydrous magnesium sulfate, and evaporated in vacuo. The oily tetrahydropyranyl ether of N-carbobenzoxy-L-serine, p-nitrophenyl ester which remains is purified by crystallization from ether; M.P. 110–112° C.

If N-p-chlorocarbobenzoxy-L-serine, tetrahydropyranyl ether is used as starting material for the above reaction, the product obtained will be the tetrahydropyranyl ether of N-p-chlorocarbobenzoxy-L-serine, p-nitrophenyl ester.

If N-p-nitrocarbobenzoxy-L-serine, tetrahydropyranyl ether is used as starting material for the above reaction, the product obtained will be the tetrahydropyranyl ether of N-p-nitrocarbobenzoxy-L-serine, p-nitrophenyl ester.

The N-carbobenzoxy-L-serine, tetrahydropyranyl ether is prepared as follows: N-carbobenzoxy-L-serine (10.0 g.) is mixed with 15.0 g. of dihydropyran and 0.7 ml. of 2 N hydrogen chloride in ethyl acetate is added. The slurry is stirred as the temperature rises to 45° C. and solution takes place. The mixture is allowed to stand at room temperature overnight, then diluted with ether, washed with sodium bicarbonate, then with saturated sodium chloride solution, and finally evaporated in vacuo. The oily product is dissolved in 45 ml. methanol and 42 ml. N sodium hydroxide is added dropwise with stirring. The solution is kept at room temperature for one hour and the methanol is then removed in vacuo. The aqueous residue is mixed with 125 ml. ethyl acetate, cooled to 4° C., and 44 ml. N hydrochloric acid is added dropwise with stirring. The ethyl acetate portion is then extracted three times with 25 ml. portions of N sodium hydroxide. The alkaline extracts are mixed with fresh ethyl acetate, cooled to 4° C., and acidified to pH 3.3 with N hydrochloric acid. The ethyl acetate layer is separated, washed with saturated sodium chloride solution, and the solvent removed in vacuo leaving N-carbobenzoxy-L-serine, tetrahydropyranyl ether.

*Example 2*

N-carbobenzoxy-L-serine, tetrahydropyranyl ether, p-nitrophenyl ester (18.0 g.) is dissolved in a mixture of 35 ml. ethanol and 35 ml. 2 N hydrochloric acid and heated on a steam bath for 10 minutes. The mixture is diluted with 200 ml. water and extracted with ethyl acetate. The ethyl acetate extracts are washed with dilute hydrochloric acid and saturated sodium chloride solution, then dried over anhydrous magnesium sulfate and evaporated in vacuo leaving N-carbobenzoxy-L-serine, p-nitrophenyl ester as an oily product which upon crystallization from ether has M.P. 113–115° C., $[\alpha]_D^{23}$ —24.4° (c. 1, DMF).

*Example 3*

To a solution of 25.0 g. of O-acetyl-N-carbobenzoxy-L-serine dissolved in 150 ml. ethyl acetate is added 12.5 g. p-nitrophenol. The ensuing solution is cooled to 0° C. and 18.5 g. of dicyclohexylcarbodiimide is added. The solution is stirred at 0° C. for one hour and then for 30 minutes at room temperature. The precipitate which forms during this time is removed and washed with ethyl acetate. The ethyl acetate solution is evaporated to a volume of 75 ml. and cyclohexane is added to precipitate the O-acetyl-N-carbobenzoxy-L-serine, p-nitrophenyl ester; recrystallization from ethanol gives white needles; M.P. 90.5–91.5° C., $[\alpha]_D^{23}$ —29.7° (c. 2, DMF).

If O-propionyl-N-carbobenzoxy-L-serine is used as starting material for the above reaction, the product obtained will be O-propionyl-N-carbobenzoxy-L-serine, p-nitrophenyl ester.

If O-chloroacetyl-N-carbobenzoxy-L-serine is used as starting material for the above reaction, the product obtained will be O-chloroacetyl-N-carbobenzoxy-L-serine, p-nitrophenyl ester.

If O-benzyl-N-carbobenzoxy-L-serine is used as starting material for the above reaction, the product obtained will be O-benzyl-N-carbobenzoxy-L-serine, p-nitrophenyl ester.

If O-acetyl-N-phthaloyl-L-serine is used as starting material for the above reaction, the product obtained will be O-acetyl-N-phthaloyl-L-serine, p-nitrophenyl ester.

*Example 4*

A mixture of 14.0 g. O-carbamyl-N-carbobenzoxy-L-serine and 7.5 g. p-nitrophenol in 100 ml. dimethylformamide is cooled in an ice bath and 11.0 g. dicyclohexylcarbodiimide is added. The mixture is allowed to stand at 5° C. for twenty hours and the dicyclohexyl urea which has precipitated is then removed. The filtrate is diluted with 300 ml. ethyl acetate and washed consecutively with water, saturated sodium bicarbonate and saturated sodium chloride. The solution is then dried over anhydrous magnesium sulfate and evaporated in vacuo leaving O-carbamyl-N-carbobenzoxy - L - serine, p-nitrophenyl ester which, upon crystallization from ethyl acetate-ether, has M.P. 144–146° C., $[\alpha]_D^{23}$ —27.3° (c. 1.1, DMF).

The O-carbamyl-N-carbobenzoxy-L-serine used in the above reaction sequence is prepared as follows: N-carbobenzoxy-L-serine methyl ester (63.5 g.) is dissolved in 400 ml. pyridine and cooled to 5° C. Phenyl chloroformate (41.0 g.) is added dropwise with stirring. The mixture is allowed to warm slowly to room temperature and then allowed to stand at room temperature overnight. The mixture is poured into 2 liters of water and extracted with 400 ml. chloroform. The chloroform extracts are washed with dilute hydrochloric acid, dried over anhydrous magnesium sulfate, and the solvent removed in vacuo leaving oily N-carbobenzoxy-L-serine, methyl ester, O-phenyl carbonate. This oil is dissolved in 120 ml. absolute methanol and is added portionwise with stirring to 600 ml. liquid ammonia. The excess ammonia is allowed to evaporate on standing overnight. The residue upon treatment with 500 ml. ether yielded O-carbamyl-N-carbobenzoxy-L-serine amide M.P. 170–172° C., $[\alpha]_D^{23}$ +8.4 (c. 1.01, DMF). O-carbamyl-N-carbobenzoxy-L-serine amide (28.0 g.) is treated with a papain solution at pH 5.5 for forty-seven hours at 37° C. (The papain solution is prepared by mixing 16.0 g. commercial papain, 2.0 g. cysteine hydrochloride in 1 liter water, adjusting the pH to 5.5 and filtering by gravity at the end of the incubation period.) The mixture is filtered from a small amount of unchanged amide and the filtrate evaporated in vacuo. The residue is then extracted with three 400 ml. hot portions of methanol, the methanol extracts acidified to Congo red with hydrochloric acid and subsequently evaporated in vacuo. The oil is taken up in chloroform, extracted with sodium bicarbonate, the combined sodium bicarbonate extracts cooled and acidified. The O-carbamyl-N-carbobenzoxy-L-serine thus obtained as colorless needles has M.P. 143–145° C., $[\alpha]_D^{23}$ —12.4° (c. 1.2, DMF).

*Example 5*

To 11.8 g. of O-acetyl-N-carbobenzoxy-DL-threonine in 100 ml. ethyl acetate is added 5.5 g. p-nitrophenol. The solution is cooled to 0° C., 8.2 g. dicyclohexylcarbodiimide is added, and the solution is stirred one hour at 0° C. and 30 minutes at room temperature. The precipitated dicyclohexyl urea is removed and the filtrate concentrated to a volume of 50 ml. Addition of cyclohexane gives a precipitate of O-acetyl-N-carbobenzoxy-DL-threonine, p-nitrophenyl ester which, upon recrystallization from ether-cyclohexane, has M.P. 89–90° C.

*Example 6*

L-prolyl-L-phenyl alanine, methyl ester, hydrochloride (3.12 g.) is suspended in 30 ml. cold ethyl acetate and 1.4 ml. of triethylamine is added. The mixture is stirred in an ice bath for about twenty minutes and the precipitated triethylamine hydrochloride is removed. To the filtrate is added 3.6 g. N-carbobenzoxy-L-serine, p-nitrophenyl ester. The mixture is maintained at 35° C. for three days and is then diluted with ethyl acetate and washed with sodium carbonate solution until no p-nitrophenol remains. The colorless solution is dried over anhydrous magnesium sulfate and concentrated on steam bath. Upon addition of ether-petroleum ether, crystalline N-carbobenzoxy-L-seryl-L-prolyl-L-phenyl alanine, methyl ester separates as colorless needles in 71% yield; M.P. 94–96° C., $[\alpha]_D^{23}$ —65.5° (c. 1, methanol).

We claim:

1. A compound of the formula

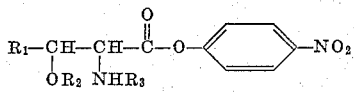

wherein $R_1$ is a member of the class consisting of hydrogen and methyl, $R_2$ is a member of the class consisting of hydrogen, lower alkanoyl, halo-substituted lower alkanoyl, benzyl, carbamyl, and tetrahydropyranyl, and $R_3$ is a member of the class consisting of carbobenzoxy, p-chlorocarbobenzoxy, p-nitrocarbobenzoxy, and phthaloyl.

2. A compound of the formula

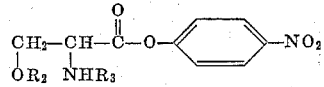

wherein $R_2$ is a member of the class consisting of hydrogen, lower alkanoyl, halo-substituted lower alkanoyl, benzyl, carbamyl, and tetrahydropyranyl, and $R_3$ is a member of the class consisting of carbobenzoxy, p-chlorocarbobenzoxy, p-nitrocarbobenzoxy, and phthaloyl.

3. N-carbobenzoxyserine, p-nitrophenyl ester.
4. O-acetyl-N-carbobenzoxyserine, p-nitrophenyl ester.
5. O-carbamyl-N-carbobenzoxyserine, p - nitrophenyl ester.
6. O-tetrahydropyranyl-N-carbobenzoxyserine, p-nitrophenyl ester.
7. A compound of the formula

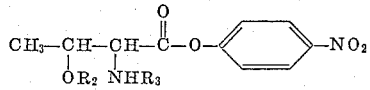

wherein $R_2$ is a member of the class consisting of hydrogen, lower alkanoyl, halo-substituted lower alkanoyl, benzyl, carbamyl, and tetrahydropyranyl, and $R_3$ is a member of the class consisting of carbobenzoxy, p-chlorocarbobenzoxy, p-nitrocarbobenzoxy, and phthaloyl.

8. N-carbobenzoxythreonine, p-nitrophenyl ester.
9. O-acetyl-N-carbobenzoxythreonine, p - nitrophenyl ester.
10. O-carbamyl-N-carbobenzoxythreonine, p - nitrophenyl ester.
11. O-tetrahydropyranyl-N-carbobenzoxythreonine, p-nitrophenyl ester.

References Cited in the file of this patent

UNITED STATES PATENTS 2,917,502     Schwyzer et al. _____ Dec. 15, 1959

OTHER REFERENCES

Woidich et al.: Monatshefte für Chemie, vol. 87, pp. 425–438 (1956).

Shive et al.: Journal of Organic Chemistry, vol. 23, pp. 1963–65 (1958).

Greenstein et al.: Chemistry of the Amino Acids, vol. 2, 1st edition, John Wiley and Sons, Inc., New York (1961).